United States Patent [19]

Shida et al.

[11] Patent Number: 5,164,258
[45] Date of Patent: Nov. 17, 1992

[54] MULTI-LAYERED STRUCTURE

[76] Inventors: Mitsuzo Shida, 68 Timber Lake Dr., Barrington, Ill. 60010; Kazuyuki Watanabe; Kouichi Yamamoto, both of Oita Research Laboratory Showa Denko K.K., 2 Nakanosu Oita-City 870-01, Japan

[21] Appl. No.: 605,229

[22] Filed: Oct. 29, 1990

[51] Int. Cl.$^5$ .................. B32B 3/26; B32B 27/08; B32B 27/14; B32B 27/32
[52] U.S. Cl. .................. 428/319.3; 428/319.7; 428/319.9; 428/476.1; 428/516; 428/520
[58] Field of Search .............. 428/317.9, 319.3, 319.7, 428/319.9, 476.1, 516, 520

[56] References Cited

U.S. PATENT DOCUMENTS 4,681,803  7/1987  Liu ............................ 428/317.9
4,701,370 10/1987  Park ........................... 428/317.9
4,702,954 10/1987  Duncan ...................... 428/317.9

Primary Examiner—William J. Van Balen
Attorney, Agent, or Firm—Willian Brinks Olds Hofer Gilson & Lione

[57] ABSTRACT

A multilayer structure is provided which has a core layer of a hygroscopic barrier material and inner and outer surface layers designed to facilitate the escape of moisture which becomes absorbed in the core layer during retort sterilization. The inner and outer surface layers include a polyolefin material which is either foamed or compounded with a filler in order to cause a substantial increase in the water vapor transmission rate of the polyolefin. Adhesive layers are present between the core layer and the inner and outer layers. Each of the inner and outer layers may include one or more individual film layers, depending on the requirements of the specific packaging application.

40 Claims, 3 Drawing Sheets

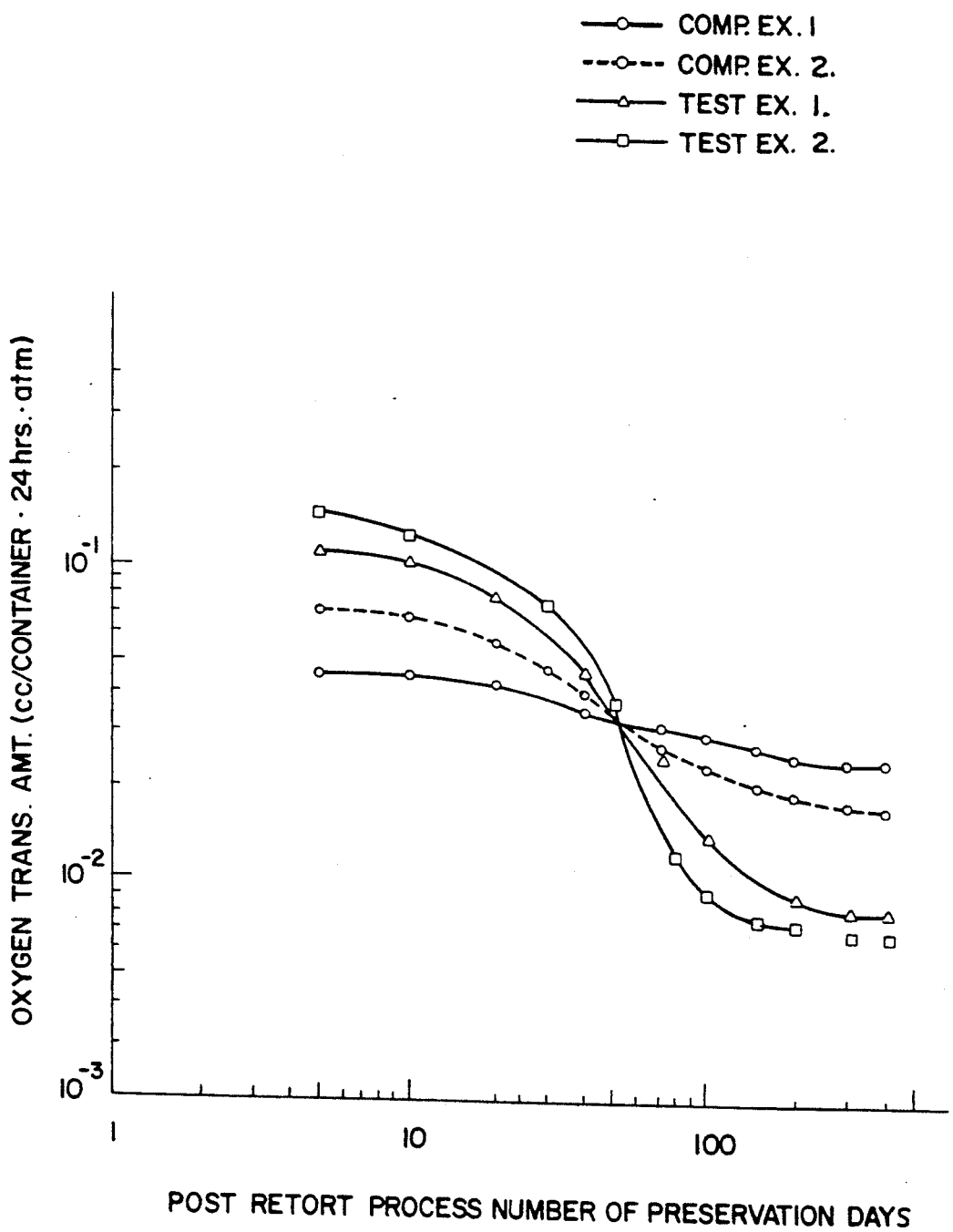

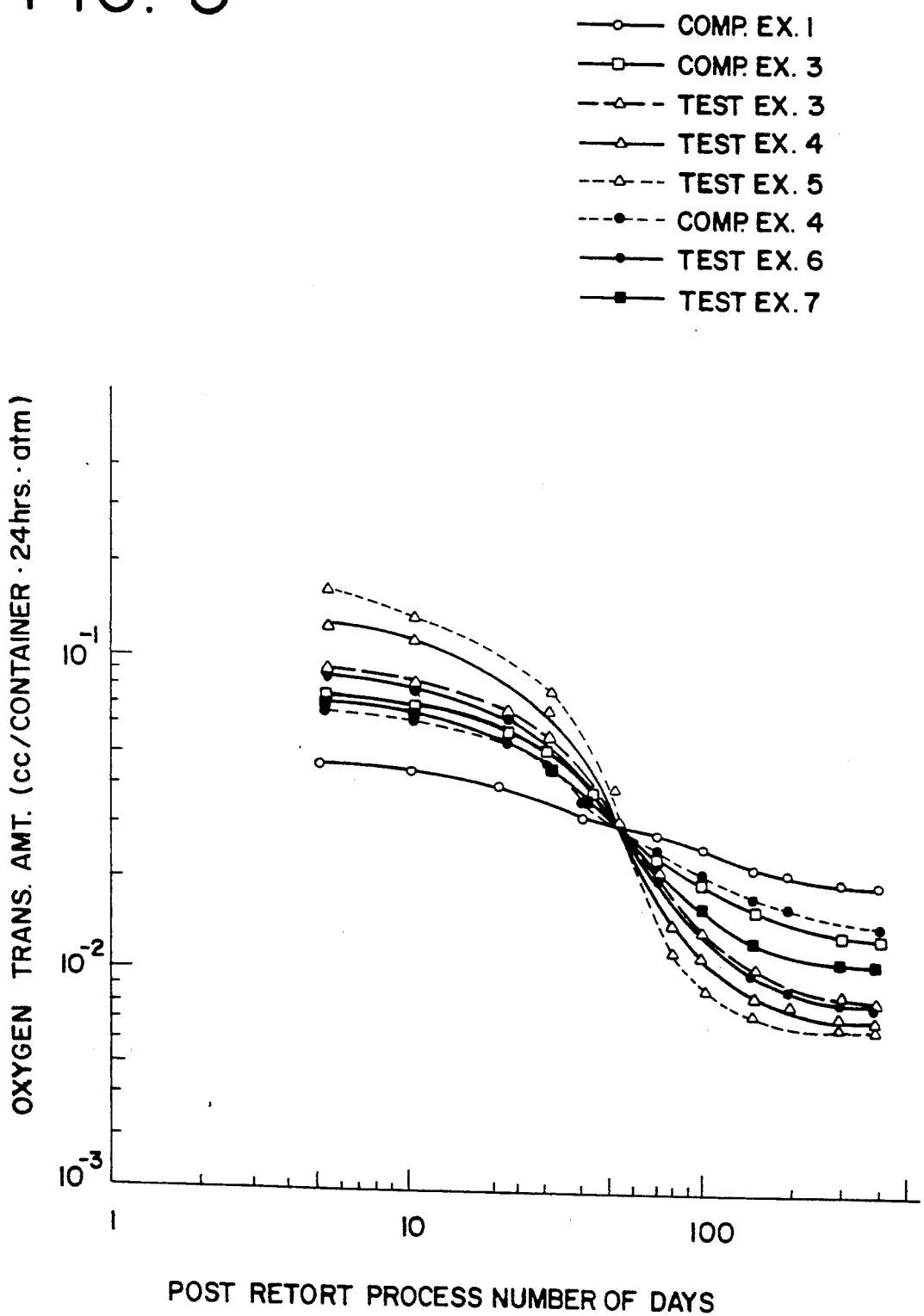

MULTI-LAYERED STRUCTURE

FIELD OF THE INVENTION

This invention is a multi-layered structure that uses its gas barrier properties to be utilized for films and containers for packaging of foods and medical products.

BACKGROUND OF THE INVENTION

Conventionally, for the multi-layered structure to be used for the above-mentioned uses, resins with high oxygen gas barriers such as saponified ethylene vinyl acetate copolymer, polyvinyl alcohol, acrylonitrile-methyl acrylate-butadiene copolymer, nylon (polyamide resin), or vinylidiene chloride copolymer are used for the core. On both sides of this core layer, hydrophobic polyolefins such as polyethylene, polypropylene, or ethylene-olefin copolymer are used.

In low humidity, due to the gas barrier layer, the multi-layered structure does not allow the passage of oxygen and prevents oxidation of the contents. As a result, over longer periods the quality of the contents would stay consistently good. However, when using this multi-layered structure for packaging food in the retort process which requires steam treatment at 90°–135° C., moisture would go through the outer layer and be absorbed by the barrier layer. In cases where the barrier layer is made of hygroscopic materials, such as saponified ethylene vinyl acetate copolymer or polyvinyl alcohol, or polyamide, due to the moisture absorption by the barrier resin, the oxygen barrier properties of the barrier layer would drop dramatically and the gas barrier layer would lose a significant portion of its function. Therefore, because of this water absorption and retention of the barrier layer, the multi-layered structure sometimes could not be used for retort food products.

FIG. 1 shows the relationship of the amount of moisture absorbed by the gas barrier layers and the amount of oxygen that passes through when a multi-layered coextruded structure made up of polypropylene/adhesive/saponified ethylene vinyl acetate copolymer/adhesive/polypropylene with a total thickness of 100 μm is tested in several retort processes.

From this figure, it is apparent that in temperatures above 120° C., which is the common range for retort processes, the water absorption amount is above 7% and the oxygen passage increases to over 1000 times its normal rate.

To correct this problem, in EP59274, U.S. Pat. Nos. 407,897, 464,443, 425,410 and Tokkaisho Japan No. 57-170748, a procedure where a drying agent derived from an inorganic metal is added to the adhesive layer between the outer and gas barrier layer was presented. However, in this procedure, problems arose such as the addition of desiccant decreasing the strength of the adhesion between the adhesive layer and barrier layer. Also, when the adhesive layer was being extruded, the generation of fisheye gels was sometimes observed.

Also, in U.S. Pat. Nos. 347,337 and 289,830, there is described a procedure to increase water resistance by adding phenolic compound to the saponified ethylene vinyl acetate copolymer and cross-linking an ether linkage through the dehydration reaction of two hydroxyl groups of the saponified ethylene vinyl acetate copolymer.

Additionally, there is the technique of making the outside layer a very water-permeable polycarbonate and the gas barrier layer as saponified ethylene vinyl acetate copolymer. In this case, the water absorbed from the retort process by the saponified ethylene vinyl acetate copolymer is dispersed in an early stage after the retort process. This would increase the speed of recovery of the gas barrier properties of the barrier material.

However, in this method, there is the problem of the polycarbonate being high in price. Also, its required molding temperature is high, making the multi-layer coextrusion difficult and requiring special extrusion equipment.

Also, there is the technique of placing the saponified ethylene vinyl acetate copolymer on the outside of the multi-layer structure. This increases the speed of recovery of the gas barrier properties. However, with this technique, during the retort process, due to the water absorption the outside layer expands. This causes the structure to lose shape and renders this technique impractical.

The inventors have developed a multi-layered structure that does not need a special extruder machine, and which exhibits superior gas barrier properties and solves the foregoing problems, at a low cost.

BRIEF DESCRIPTION OF THE DRAWINGS

FIG. 2 and FIG. 3 show the oxygen transmittal amounts after the retort process and changes in the amounts as function time.

BRIEF DESCRIPTION OF THE INVENTION

Figure 1:
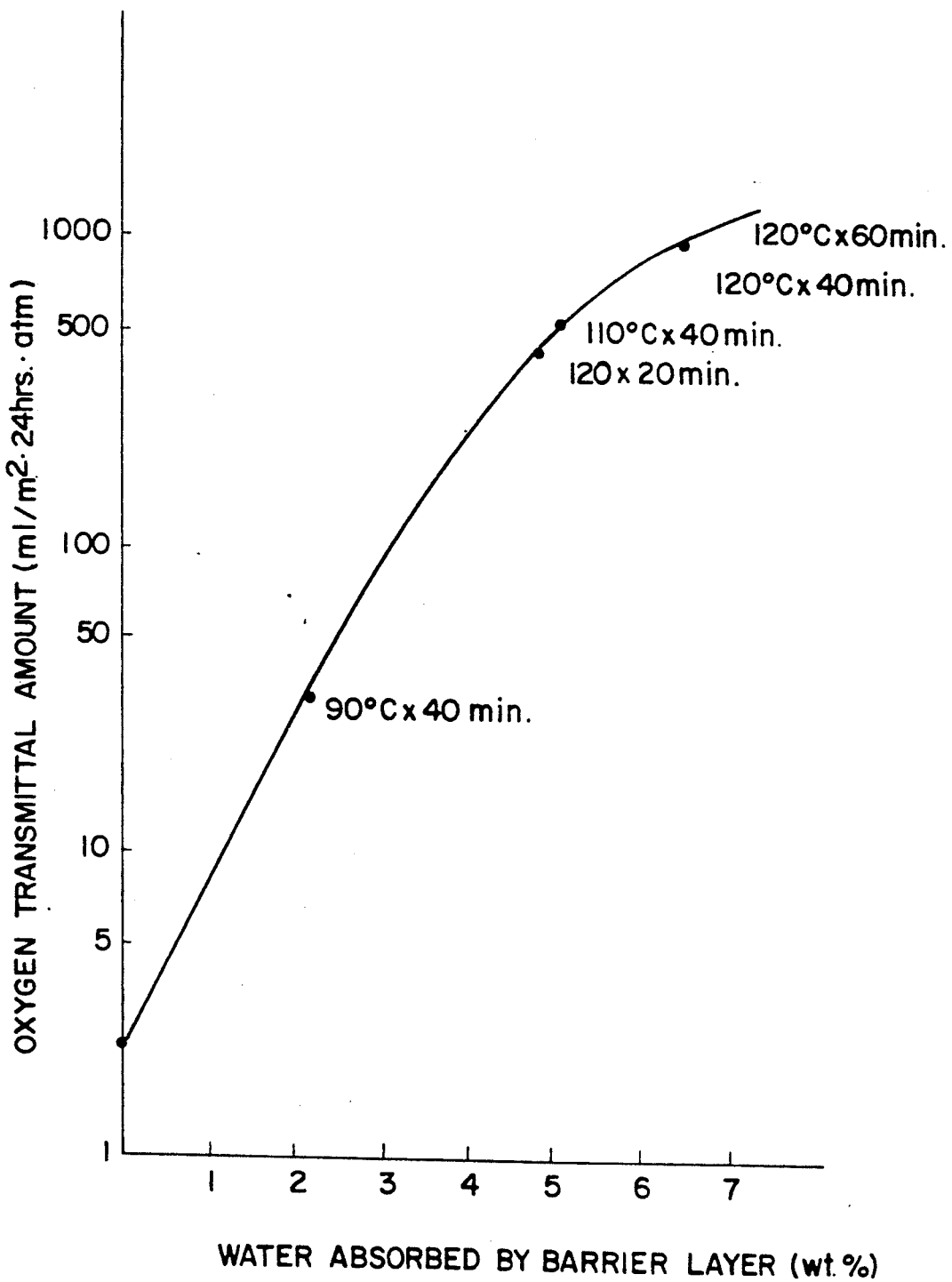
FIG. 1 shows the amounts of absorbed water in the hygroscopic gas barrier layer and of oxygen gas transmitted.

The multi-layered structure of the invention has a core layer made of a hygroscopic gas barrier material, and inner and outer surface layers on both sides of the core layer. Adhesive layers are used to bond the core layer to the inner and outer surface layers. The surface layers can each be one or more layers.

The multi-layered structure of the invention has the special characteristics of its inner and/or outer surface layers having water vapor transmission rates (hereinafter WVTR) of over 500 (g$\mu$m/m$^2$·24 hrs) at a temperature of 37.8° C. and at 90% relative humidity. The structure is further characterized in that the overall WVTR of either surface layer is above 1 (g/m$^2$·24 hrs).

DETAILED DESCRIPTION OF THE INVENTION

This invention is a multi-layered structure which has a moisture absorbent core layer with gas barrier properties and, on either or both sides of the core layer, has inner and/or outer layers having a WVTR of over 500 (g$\mu$m/m$^2$·24 hrs.) at a temperature of 37.8° C. and relative humidity of 90%. In addition, the inner and/or outer layers have an overall WVTR of at least 1 (g/m$^2$·24 hrs). Therefore, the moisture absorbed by the gas barrier layer during the retort sterilization process dries quicker and increases the recovery of the gas barrier property of the core layer more quickly.

With this invention, examples of the absorbent gas barrier layers include saponified ethylene vinyl acetate copolymer and saponified propylene vinyl acetate copolymer. Due to the ease of polymerization, the saponified ethylene vinyl acetate copolymer (herein EVOH) is most desirable.

The EVOH that is used in the invention is a polymer containing 15-60 mole % ethylene with degree of saponification of vinyl acetate of over 90%. When less than 15 mole % of ethylene is used, the processability in a melt state declines, and above 60 mole %, the gas barrier property declines. Also, when the degree of saponification of the vinyl acetate percentage goes below 90 mole %, the gas barrier property decreases. It is preferred to have an ethylene content of 25-50 mole %, and a degree of saponification of over 96 mole %. In addition to ethylene and vinyl acetate (or saponified vinyl alcohol), the copolymer can contain small amounts of comonomer of unsaturated acid such as acrylic acid, methacrylic acid, crotonic acid, maleic acid, or their alkyl esters, or α-olefins such as propylene, butene, α-decene, or α-octa decene.

Further examples of materials for the absorbent gas barrier layer include polyamide resins. Examples of polyamide resins include 6-nylon, 6,6 nylon, 6,10 nylon, 12 nylon or copolyamides with metaxylene diamine.

For the thermoplastic resins that may be used for the inner and outer layers, polyolefin resins represented by polypropylene and polyethylene are used. The polyolefin resin in the invention can be medium to high density polyethylene, homopolymer, polypropylene, ethylene propylene random copolymer, ethylene propylene block copolymer, or ethylene and α-olefin copolymer with carbon number 3-12. Examples of ethylene and α-olefin copolymer with carbon number 3-12 include, ethylene butene-1 copolymer, ethylene-4 methyl pentane-1 copolymer, ethylene hexene-1 copolymer and ethylene octane-1 copolymer. Among these, usually when related to the packaging of food or medical products in the retort process, propylene resins such as homopolymer polypropylene, propylene ethylene random copolymer, and propylene ethylene block copolymer are desirable.

For these polypropylene resins that are suitable for the inner and outer layers, under the 37.8° C., 90% RH conditions, the WVTR of regular unoriented state is approximately 270 (g$\mu$m/m$^2$ 24 hrs) and that of oriented state is about 150 (g$\mu$m/m$^2$ 24 hrs). (For example, "Packaging Technology" Vol. 23, No. 4, p. 19 (1985)). It is smaller than other thermoplastic resins and is usually used as moisture barrier materials.

However, regardless of the hydrophobic qualities, at high temperatures, such as those used in the retort sterilization process, the polypropylene is quick to allow moisture to pass through. The WVTR at high temperatures can be expressed by the following equation:

$$[P = Ae^{-E/RT}]$$

Where
$P$: WVTR (g/m$^2$ · 24 hrs)
$A$: Frequency Factor (Constant)
$e$: Base of Natural Logarithm (2.718)
$E$: Activation Energy (cal/mol)
$R$: Gas Constant (1.988 cal/mol)
$T$: Absolute Temperature (K.)
Thus, $$\text{Log}P_2 = \frac{E}{2.303 \times R}\left(\frac{1}{T_1} - \frac{1}{T_2}\right) + \log P_1$$

($T$ represents the Absolute temperature,
$P$ is the WVTR to $T_1$ $P_2$ relates to $T_2$)

Thus, the moisture resulting from the high temperature in the retort process that is transmitted is absorbed by the EVOH layer to an equilibrium which cause the gas barrier properties to decline.

The water absorbed by this retort sterilization process is cooled to room temperature after the retort process, however, as evident through the formula presented above, at room temperature, once water has been absorbed in the structure, it is difficult to escape the structure. In other words, the gas barrier property remains at its declined state and contents of the package can be exposed to oxygen resulting in potential spoilage.

To resolve this problem, a process in which the inner and/or outer layer has an increased WVTR and the water that is absorbed by the EVOH layer can be dispersed quickly, so that the oxygen gas barrier property of the EVOH layer can be recovered is desirable. Therefore, the WVTR of the inner and/or outer layer must be more than 1 (g/m$^2$ 24 hrs) at 37.8° C., and 90RH %. Below this, the recovery of the EVOH layer to be a gas barrier is slow and the ability to preserve the contents suffers.

To raise the inner and/or outer layer water transmittal rate, the layers can be made thinner. However, this would weaken the strength and durability of the package, making it impractical and the fabrication difficult as well.

Because of this, material to be used for the inner and/or outer layer should have a WVTR of minimum 500 (g$\mu$m/m$^2$·24 hrs) at 37.8° C., 90RH %, to be preferred. If such a material is used, ample evaporation can be achieved at a practical thickness and the desirable durability and strength of the package can be attained.

The polyolefin layer that makes up the inner and/or outer layer with the WVTR of over 500 (g$\mu$m/m$^2$ 24 hrs) at 37.8° C., 90RH % can be attained by mixing organic fillers or inorganic fillers into the polyolefin. For the organic fillers, there are both natural and synthetic types. Natural types include by-products of the agriculture and forestry industry such as sawdust, fibers, cotton, starches, and pulp, etc. Synthetic types include recycled items such as rayon or cellophane; fibers such as nylon, or other polyacrylnitrile: Fibers, powders, and flakes of polyester, or polyvinyl alcohol. When considering cost effectiveness and ease of compounding, sawdust, cellulose, pulverized rice hulls, pulverized almond shells, and pulverized peanut shells are desirable. Water absorbent organic fillers are desirable. Inorganic fillers include calcium carbonate, talc, fiberglass, aluminum hydroxide, magnesium hydroxide, clay, diatomaceous earth, silica, wollastonite, mica, titanium oxide, porous glass, zeolite, coagulated ash, pumice coagulated ash, sandstone, amphibole or silt. Among these, based on the amount of water transmittance, zeolites, porous glass, zeolite coagulated ash, clay, diatomaceous earth, silt and pumice are desirable. In addition, water absorbent types are desirable. Water absorbent inorganic fillers in this invention are fillers that absorb water, also included are those fillers that have structures that hold, or store water.

The purpose of these fillers is that in the case where the polymer compound making up the inner and/or outer layer of the multi-layered structure is blended with fillers, the water absorbed by the EVOH in the heat sterilization process escapes more easily from the filler portion than the polymer portion. As described previously, desirable inorganic fillers are porous as opposed to fillers like mica which consist of platelets. It is thought that in porous materials, the water absorbed in the heat sterilization process easily passes through the many holes which speeds up the drying process.

To form the proper inner and/or outer surface layers, it is necessary to blend the ratios in a range of over 15 wt % and not more than 70 wt %. If the ratio is below 15 wt %, the gas barrier recovery is not adequate and if it is above 70 wt %, there is difficulty in the blending. As presented in Tokkai Sho No. 59-220319, based on the so-called gelation procedure, a stable, strong structure can be produced.

Due to the inclusion of inorganic and organic fillers the modulus of elasticity and stiffness of the polyolefin resin increases, thereby thinner layers can be used than with pure polyolefin, while maintaining the same or similar modulus of elasticity and stiffness. The use of such thinner layers allows the water absorbed in the barrier layer to dry faster.

On the other hand, to increase the WVTR of the surface layers, organic foaming agents can be used for creating a more porous polyolefin layer or layers. This could also result in a desirable heat insulation effect. Examples of organic foaming agents, include inorganic foaming agents and nitrous compound, azo compound, sulfonyl, and pyrrolide. Among these, from the point of foams and hygiene considerations, azodikylamide, or blended foaming agents that include this as a main component, and azo compounds such as azo bisisobutylnitrile, barium azodicarboxylate are desirable.

The machines used to form the resin compound which makes up this invention's surface layers, include ribbon blenders, high speed mixers, kneaders, Banbury mixers and extruders. The resin compound that makes up this invention's surface layers can be formed by the well known melt extruders, compression molders, transfer extruders, blow-molding machines, heat molding machines, rotational molders, and dip molders to make films, sheets, tubes, bottles or any other fabricated objects.

The extrusion temperature used in the fabrication is dependent on the type of resin, molecular weight, composition of the components, the nature of the extruder, or foaming temperature of the foaming agent, but generally, the temperature is in the range of 150°-350° C.

Also, the compound used for the multi-layer coextrusion to form the surface layers, can be pre-blended in the extruder. To create the multi-layered structure, usually the number of extruders used is equal to the number of types of resins used. The resins in a melted state are stacked together in a multi-layered state and extruded simultaneously; i.e., coextruded. The adhesive used for this type of coextrusion method for EVOH and polyolefin with filler is well known as a modified polyolefin. The resin is modified by grafting acid anhydride such as maleic anhydride onto polyolefin, such as polyethylene or polypropylene, sometimes in presence of organic peroxide catalyst.

Another method that can be used is after preparing the materials for the surface layers, utilizing dry lamination or extrusion coating to apply the EVOH and form laminates.

The multi-layered structure of this invention can be expressed as follows, when polyolefin layer with filler or foamed porous polyolefin as P, EVOH layer as E, adhesive layer as D: (P+E)/D/E/D/(P+E), P/D/E/D/P; or when making pure polyolefin as A: A/D/E/D/P, A/P/D/E/D/P, A/(P+E)/D/E/D/(P+E). These are examples of structures with which a very quick recovery of gas barrier properties can be attained.

In the following Examples, the Water Vapor Transmission Rates were measured according to ASTM E-372-78, and using Modern Control Company's Permatron-W, Measurements were taken with the surface layer material at 37.8° C., 90RH %. The gas transmission rates were measured according to ASTM D3985-81, using Modern Control Company's OXTRAN-10/50A. Measurements were taken with a multi-layered structure at 23° C., 65RH %.

TEST EXAMPLES 1-2 AND COMPARATIVE EXAMPLE 1, USING THE DRY LAMINATION METHOD

For the EVOH resin, Nippon Gohsei Kagaku (Inc)'s Soarnol A with ethylene content of 44 mole % was used, in a 40 mm $\phi$ sheet extruder to create a single layer sheet at 220° C. with a thickness of 140 $\mu$m. Also, the amount of the additive used in the outer surface layer, azo foaming compound (Sanbkyo Corp. manufactured as Celllmic C), was blended in polypropylene, manufactured by Showa Denko (K.K.) as Sho-Allomer SA510 (MFR (following JIS-K-6758 at 230° C.) of 0.5 g/10 min) in a Henschel mixer, and processed through the same 40 mm $\phi$ sheet extruder at 230° C. with a thickness of 400 $\mu$m. Several foam sheets with different foam densities were produced. The WVTR of these sheets are shown in Table I.

The inner surface layer of the multiple layered structure was made with polypropylene Sho-Allomer SA510, using the same 40 mm $\phi$ sheet extruder to get a sheet of 400 $\mu$m thickness at 230° C. The sheets, using urethane adhesive (Toyo Morton, Inc. produced Adcoat, primary agent AD-300A, hardening agent AD-300B, solvent BTS-500 at a 100:100:116 ratio) and a laminator, were dry laminated at an amount of 4.1 g/m², laminating pressure of 5.0 Kg/cm², heat roll at 65° C., and drying temperature at 90°-110° C. A polypropylene/EVOH/Foam sheet multi-layered structure was attained. This structure was then put in vacuum pressure forming equipment and underwent heat molding at 155° C. (Deep draw ratio of 1.5, content volume of 260 cc). These newly molded containers were then used in the retort process at 125° C., for 30 minutes and the oxygen gas barrier properties after cooling were measured. These results are shown in FIG. 2.

To compare, before retort treatment, the oxygen transmission rate of this structure was $6.7 \times 10^{-3}$ (cc/container·24 hrs.atm)

TABLE 1

|  | Foam Multiple | WVTR (g$\mu$m/m² · 24 hrs) |
|---|---|---|
| Comparative Example 1 | No foam | 260 |
| Test Example 1 | 1.5 | 1200 |
| Test Example 2 | 2.5 | 1900 |

TEST EXAMPLES 3-7 AND COMPARATIVE EXAMPLES 2-3, USING MULTI-LAYERED COEXTRUSION

The EVOH resin used was the Nippon Gohsei produced Soarnol A with ethylene content of 44 mole %. For the adhesive resin, ER 321P, produced by Showa Denko K.K. having MFR of 5.5 (measured at 230° C. according to JIS K-6758) was used. And for the polypropylene which is formed the innermost layer of the multi-layered structure, Sho-Allomer SA510 was used. For the outer layers, the various fillers shown at Table 2 were used with various ratios with Sho-Allomer SA510 and were prepared for extrusion in the Henschel mixer.

Using these various materials, and using a feedblock for four different resins, a five layer sheet was extruded at 230° C., SA510 with a thickness of 240 ER321P with a thickness of 50 m, Soarnol A with thickness of 140 μm and SA510 with filler with thickness of 100 μm were extruded to make a multi-layered structure of SA510/ER-321P/Soarnol A/ER321P/SA510 with filler. This multi-layered structure was put in vacuum foaming equipment and heat molded at 155° C. (Deep draw ratio at 1.5, container volume 260 cc). The structure produced was used in retort processing at 125° C. for 30 minutes and the gas barrier properties were measured once the structure was cooled to room temperature. These results are shown in FIG. 3.

In addition the WVTR amount of these multi-layered structures with a filler blended outer layer was measured after such a layer was produced with a thickness of 100 μm using a 40 mm φ single layer sheet extruder. The results are shown in Table 2.

TABLE 2

| | Filler Type | Mix Ratio Polypropylene SA510 | Filler | WVTR gμm/m$^2$ · 24 hrs |
|---|---|---|---|---|
| Comparative Example 2 | Pulverized Rice Hull | 95 | 5 | 290 |
| Test Ex. 3 | . | 85 | 20 | 950 |
| Test Ex. 4 | . | 65 | 35 | 1600 |
| Test Ex. 5 | . | 55 | 45 | 2000 |
| Comparative Example 3 | Cellulose | 75 | 10 | 350 |
| Test Ex. 6 | . | 55 | 45 | 920 |
| Test Ex. 7 | PVA | 55 | 45 | 760 |

Effects

As stated above, the multi-layered structure of this invention excels in its gas barrier properties and excels in its recovery of gas barrier properties after undergoing the heat sterilization phase of the retort process. Therefore, for packaging of food and medical products, and putting them through the retort process, the multi-layered structure excels in its effectiveness in preservation, etc.

We claim:

1. A multi-layered structure, comprising:
   a core layer formed of a hygroscopic gas barrier material selected from the group consisting of saponified ethylene vinyl acetate polymers, saponified propylene vinyl acetate polymers, polyamides, and combinations thereof;
   an outer layer on a first side of the core layer, comprising a polyolefin material; and
   an inner layer on a second side of the core layer, comprising a polyolefin material;
   wherein at least one of the inner and outer layers is water permeable and has a water vapor transmission rate of over 500 (gμm/m$^2$·24 hrs.) at a temperature of 37.8° C. and a relative humidity of 90%;
   wherein said water permeable layer has an overall water vapor transmission rate above 1 (g/m$^2$·24 hrs.) at a temperature of 37.8° C. and a relative humidity of 90%.

2. The multi-layered structure of claim 1 wherein the core layer comprises a saponified ethylene vinyl acetate copolymer.

3. The multi-layered structure of claim 2 wherein the copolymer contains 15–60 mole % ethylene and the degree of saponification of vinyl acetate is over 90 mole %.

4. The multi-layered structure of claim 3 wherein the copolymer contains 25–50 mole % ethylene and the degree of saponification of vinyl acetate is over 96 mole %.

5. The multi-layered structure of claim 1 wherein the core layer comprises a saponified propylene vinyl acetate copolymer.

6. The multi-layered structure of claim 1 wherein the core layer comprises a polyamide resin.

7. The multi-layered structure of claim 1 wherein said water permeable layer comprises a foamed polyolefin material.

8. The multi-layered structure of claim 7 wherein the foamed polyolefin material comprises a foamed polypropylene resin.

9. The multi-layered structure of claim 7 wherein the foamed polyolefin material comprises a foamed polyethylene resin.

10. The multi-layered structure of claim 1 wherein said water permeable layer comprises polyolefin and a filler.

11. The multi-layered structure of claim 10 wherein the polyolefin comprises a polypropylene resin.

12. The multi-layered structure of claim 10 wherein the polyolefin comprises a polyethylene resin.

13. The multi-layered structure of claim 10 wherein the filler comprises an organic filler.

14. The multi-layered structure of claim 13 wherein the organic filler comprises a natural organic filler selected from the group consisting of sawdust, fibers, cotton, starches, pulp, cellulose, pulverized rice hulls, pulverized almond shells and pulverized peanut shells.

15. The multi-layered structure of claim 13 wherein the organic filler comprises a synthetic organic filler selected from the group consisting of rayon, cellophane, nylon, polyacrylonitrile, polyester and polyvinyl alcohol.

16. The multi-layered structure of claim 10 wherein the filler comprises an inorganic filler.

17. The multi-layered structure of claim 16 wherein the inorganic filler comprises a material selected from the group consisting of calcium carbonate, talc, fiberglass, aluminum hydroxide, magnesium hydroxide, clay, diatomaceous earth, silica, wollastonite, mica, titanium oxide, porous glass, zeolite, coagulated ash, pumica, sandstone, amphibole and silt.

18. The multi-layered structure of claim 10 wherein the filler comprises a water absorbent filler.

19. The multi-layered structure of claim 1 further comprising a first adhesive layer between the outer layer and the core layer, and a second adhesive layer between the inner layer and the core layer.

20. The multi-layered structure of claim 19 wherein each of the adhesive layers comprises an acid anhydride grafted onto a polyolefin.

21. A multi-layered packaging structure, comprising:
   a core layer formed of a hygroscopic gas barrier material selected from the group consisting of saponified ethylene vinyl acetate polymers, saponified propylene vinyl acetate polymers, polyamides, and combinations thereof;

an outer layer on a first side of the core layer, comprising a layer of a foamed polyolefin material; and an inner layer on a second side of the core layer, comprising a layer of a thermoplastic material;

wherein the outer layer is water permeable and has a water vapor transmission rate of over 500 (gμm/m²·24 hrs.) at a temperature of 37.8° C. and a relative humidity of 90%;

wherein the outer layer has an overall water vapor transmission rate of above 1 (g/m²·24 hrs.) at a temperature of 37.8° C. and a relative humidity of 90%.

22. The multi-layered packaging structure of claim 21 further comprising adhesive layers between each of the inner and outer layers and the core layer.

23. The multi-layered packaging structure of claim 21 wherein the core layer comprises polyethylene vinyl alcohol.

24. The multi-layered packaging structure of claim 21 wherein the core layer comprises nylon.

25. The multi-layered structure of claim 21 wherein the outer layer comprises a foamed polypropylene material.

26. The multi-layered packaging structure of claim 21 wherein the outer layer comprises a foamed polyethylene material.

27. The multi-layered packaging structure of claim 21 further comprising a layer of regrind material.

28. A multi-layered packaging structure, comprising:

a core layer formed of a hygroscopic gas barrier material selected from the group consisting of saponified ethylene vinyl acetate polymers, saponified propylene vinyl acetate polymers, polyamides, and combinations thereof;

an outer layer on a first side of the core layer, comprising a layer of a filled polyolefin material; and an inner layer on a second side of the core layer, comprising a layer of a thermoplastic material;

wherein the outer layer is water permeable and has a water vapor transmission rate of over 500 (gμm/m²·24 hrs.) at a temperature of 37.8° C. and a relative humidity of 90%;

wherein the outer layer has an overall water vapor transmission rate of above 1 (g/m²·24 hrs.) at a temperature of 37.8° C. and a relative humidity of 90%.

29. The multi-layered packaging structure of claim 28 further comprising adhesive layers between each of the inner and outer layers and the core layer.

30. The multi-layered packaging structure of claim 28 wherein the core layer comprises ethylene vinyl alcohol.

31. The multi-layered packaging structure of claim 28 wherein the core layer comprises nylon.

32. The multi-layered packaging structure of claim 28 wherein the outer layer comprises a filled polypropylene material.

33. The multi-layered packaging structure of claim 28 wherein the outer layer comprises a filled polyethylene material.

34. The multi-layered packaging structure of claim 28 further comprising a regrind layer.

35. The multi-layered packaging structure of claim 28 wherein the filled polyolefin material in the outer layer comprises an organic filler.

36. The multi-layered packaging structure of claim 35 wherein the organic filler comprises a natural organic filler selected from the group consisting of sawdust, fibers, cotton, starches, pulp, cellulose, pulverized rice hulls, pulverized almond shells and pulverized peanut shells.

37. The multi-layered packaging structure of claim 35 wherein the organic filler comprises a synthetic organic filler selected from the group consisting of rayon, cellophane, nylon, polyacrylonitrile, polyester and polyvinyl alcohol.

38. The multi-layered packaging structure of claim 28 wherein filled polyolefin material in the outer layer comprises an inorganic filler.

39. The multi-layered packaging structure of claim 38 wherein the inorganic filler comprises a material selected from the group consisting of calcium carbonate, talc, fiberglass, aluminum hydroxide, magnesium hydroxide, clay, diatomaceous earth, silica, wollastonite, mica, titanium oxide, porous glass, zeolite, coagulated ash, pumica sandstone, amphibole and silt.

40. The multi-layered packaging structure of claim 28 wherein the filled polyolefin material in the outer layer comprises a water absorbent filler.

* * * * *